United States Patent [19]
Jones

[11] 4,393,382
[45] Jul. 12, 1983

[54] DIRECTION FINDING AND RANGING SYSTEM FOR LOCATING SCANNING EMITTERS

[75] Inventor: William R. Jones, Kent, Wash.

[73] Assignee: The Boeing Company, Seattle, Wash.

[21] Appl. No.: 144,166

[22] Filed: Apr. 25, 1980

[51] Int. Cl.³ .......................... G01S 11/00; G01S 3/48
[52] U.S. Cl. .............................. 343/112 D; 343/18 E
[58] Field of Search .............. 343/18 E, 112 R, 112 D

[56] References Cited

U.S. PATENT DOCUMENTS

| 2,646,564 | 7/1953 | Perilhou | 343/112 R X |
| 2,668,288 | 2/1954 | Perilhou | 343/112 R |
| 2,760,190 | 8/1956 | Henrici | 343/112 R X |
| 3,430,243 | 2/1969 | Evans | 343/112 R |

FOREIGN PATENT DOCUMENTS 2536117 2/1977 Fed. Rep. of Germany ... 343/112 R

*Primary Examiner*—T. H. Tubbesing
*Attorney, Agent, or Firm*—Christensen, O'Connor, Johnson & Kindness

[57] ABSTRACT

Three or more receiving antennas are arrayed in a triangle that in turn is oriented in the same generally defined plane as a scanning RF beam emitted by a distant source of radar or other RF transmission, which is to be located. Signals received by the arrayed antennas are coupled to signal processing circuitry which measures the various time intervals (or differentials) that it takes for the source transmission to sweep through the angles subtended, at the source, by different spaced-apart pairs of the arrayed antennas. From these measured time differentials and the known geometry of the arrayed antennas and a measured scan rate of the transmission source, the signal processing circuitry determines the angle of arrival of the transmission with respect to the array, and then further combines the thusly determined angle of arrival with a signal representing the measured time differential associated with one selected pair of the arrayed antennas, to yield a signal proportional to the distance (range) of the source from the antenna array.

17 Claims, 10 Drawing Figures

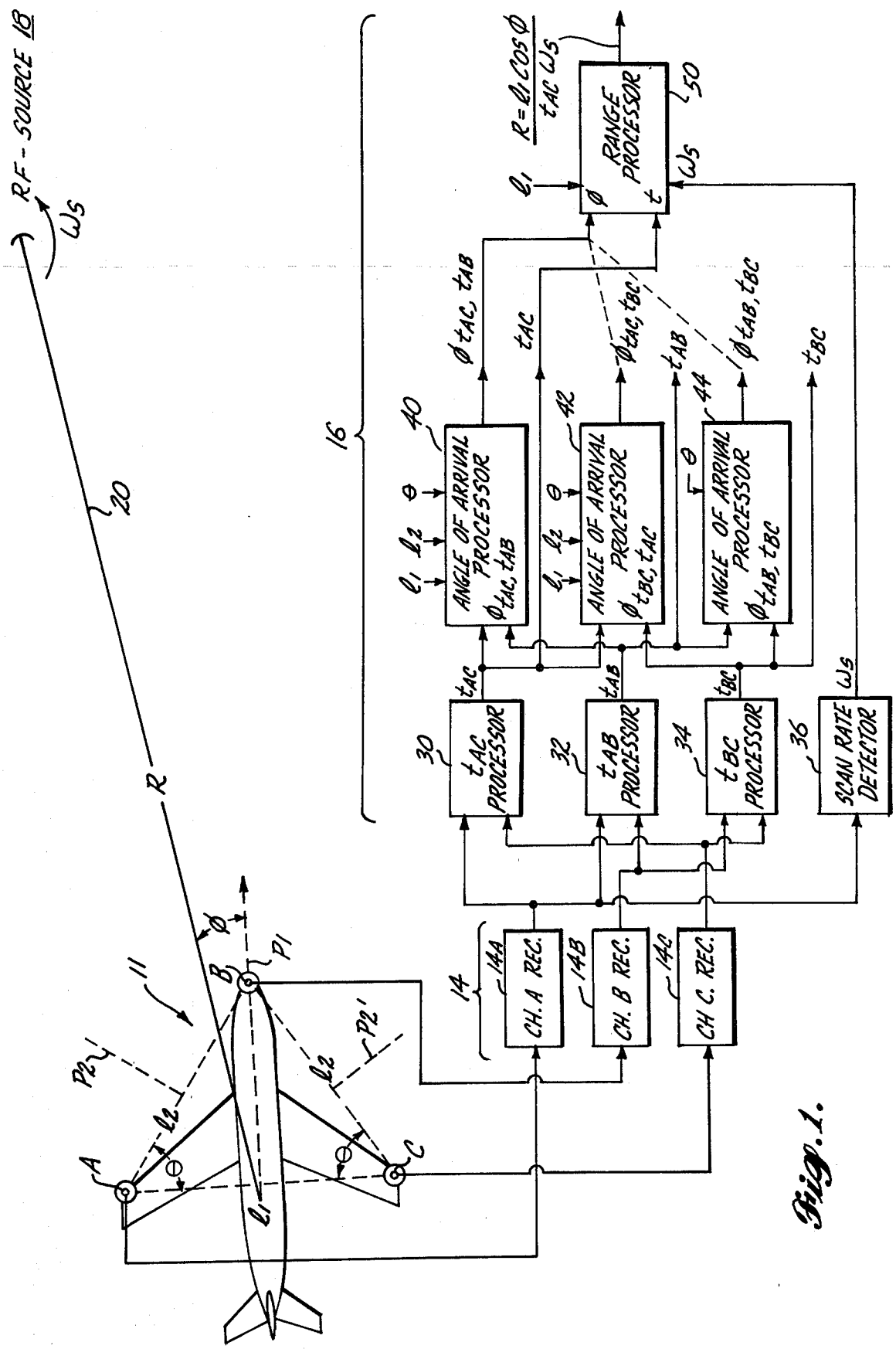

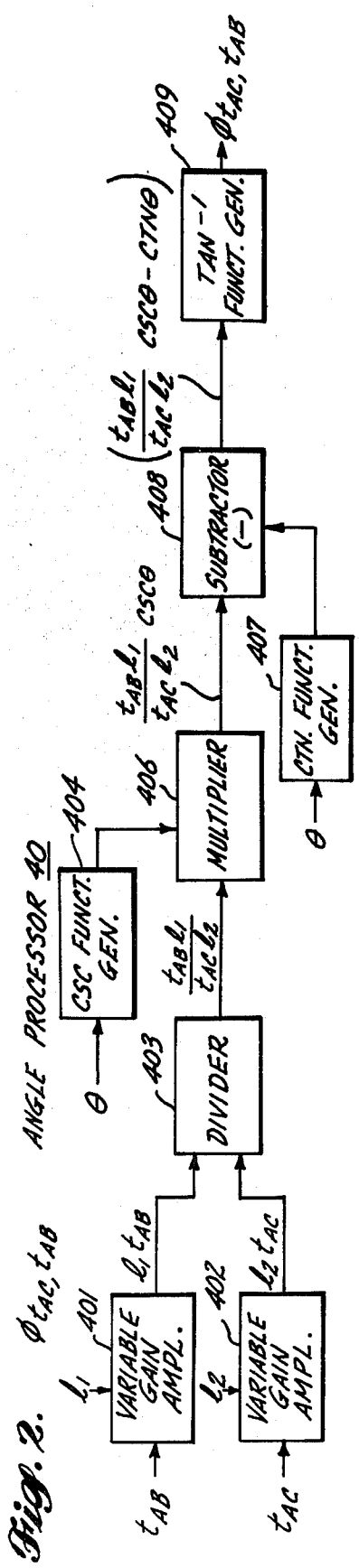
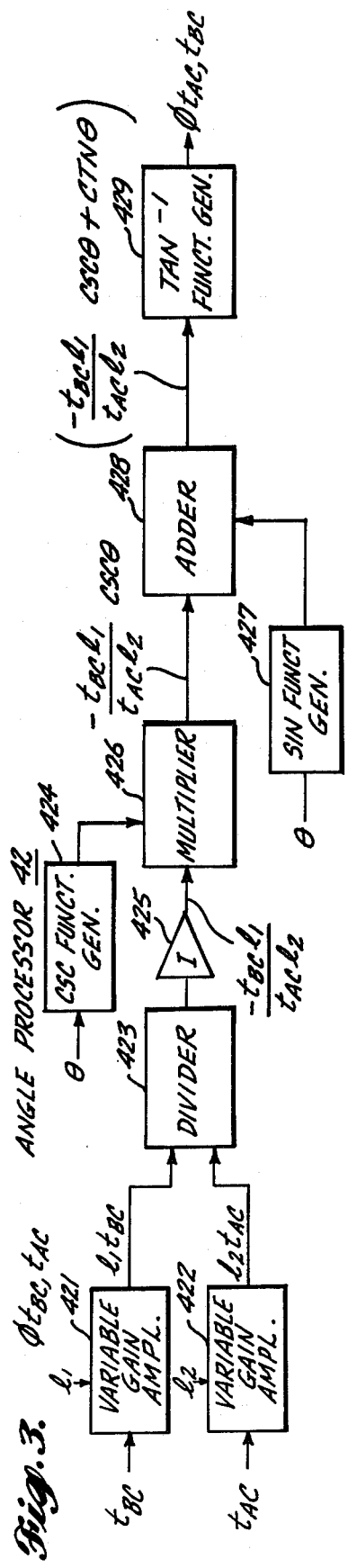
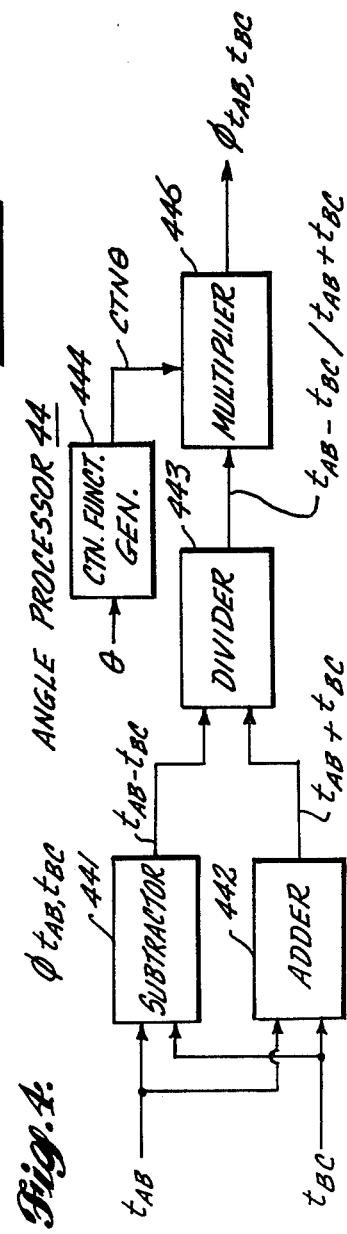

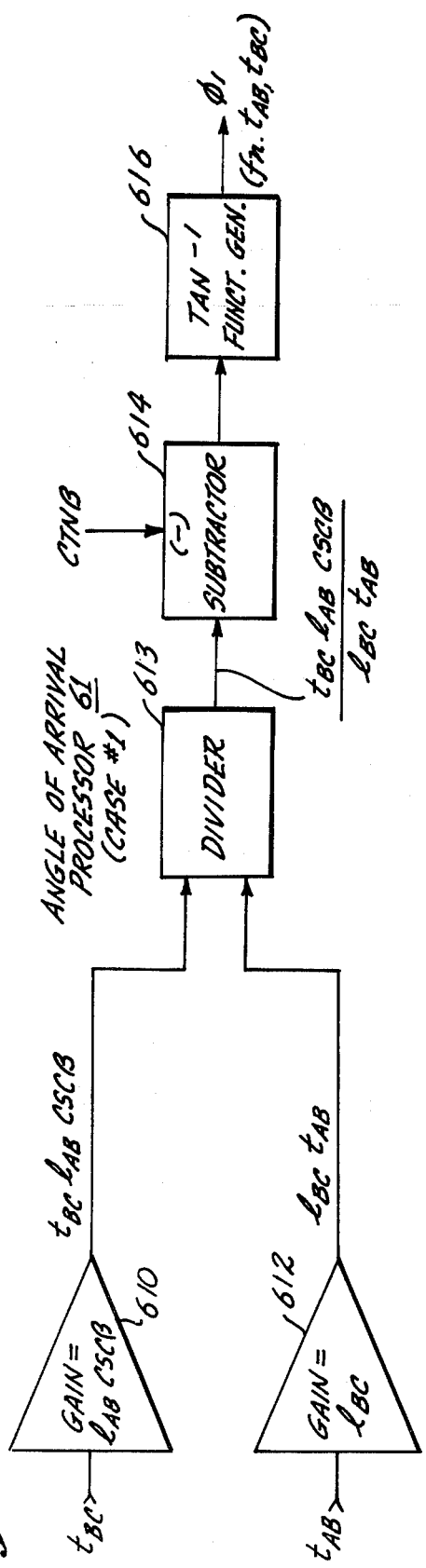
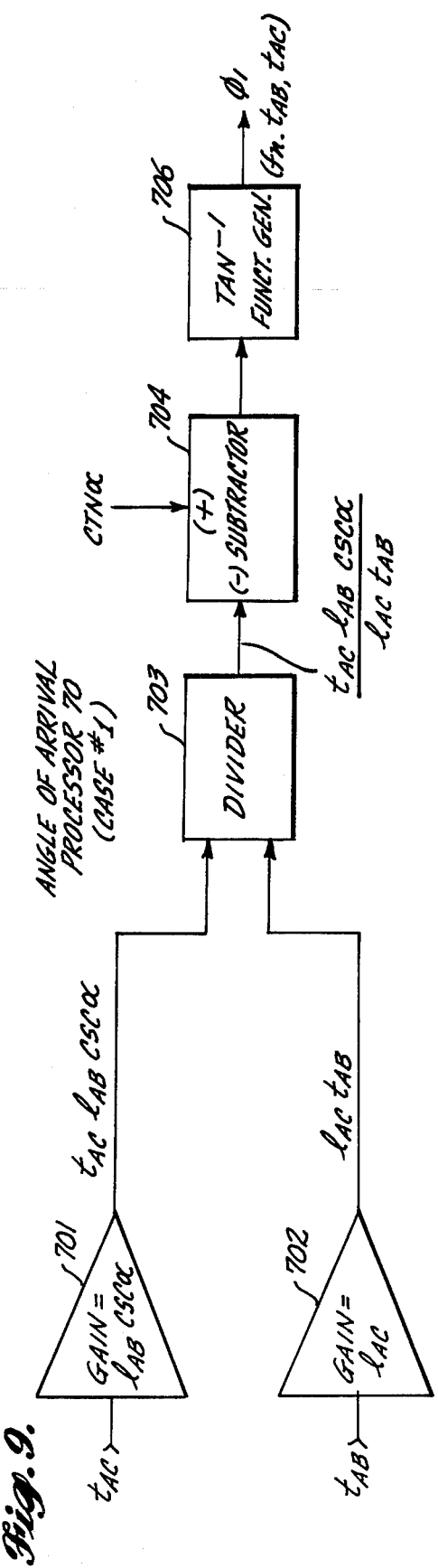

DIRECTION FINDING AND RANGING SYSTEM FOR LOCATING SCANNING EMITTERS

BACKGROUND OF THE INVENTION

This invention pertains to systems for passively determining the direction of arrival and range of radiant energy emitted by a distant, scanning source, such as a radar transmitter.

While systems in accordance with the invention can be, in general, used with many different types of scanning, radiant energy sources, such as electromagnetic radiation including radio frequencies, visible and invisible light, etc., and such as mechanical wave energy including sound, it is particularly useful for locating scanning sources that emit radio frequencies such as radar transmitters. Passive-type range and direction determining systems involve locating the source of the radiant energy by receiving the transmission of such energy, developing electrical signals representative thereof and processing such signals to yield the desired information, without requiring a change in position of the receiving station. While the range and direction information can be readily obtained by using standard triangulation techniques involving the movement of the receiving station between two or more different locations, such maneuvers of the receiving station are at best time consuming, and in a military environment, strategically undesirable.

For these reasons, passive-type systems have been developed in which the source radiation can be located both in terms of direction and range at any given instance. The measurements may be made from a receiving aircraft, while in flight, in which case the direction and range information is continuously changing as the receiving aircraft and source are moving relative to each other. In one known passive-type system, pertinent to the present invention, the range measurement is made by deploying a pair of spaced-apart receiving antennas, such as may be mounted on the wing tips of the receiving aircraft, and then measuring a time differential $t_{21}$ resulting from the slight time difference in the receipt of the source radiation as it scans broadside of the pair of spaced-apart receiving antennas. The measured time differential $t_{21}$ together with the detected scan rate $\omega_s$, and the known geometry of the receiving antennas relative to the distant scanning source, provide sufficient information for automatically and electronically measuring the range R.

The simplest geometrical configuration for such a system involves a source that is located along the perpendicular bisector of an imaginary line that extends directly between the spaced-apart receiving antennas. In such case, the relationship between the measured time differential $t_{21}$ associated with the receipt of the scanning source at the spaced antennas, the source scan rate $\omega_s$ and the range R is easily derived. However, in most actual systems, the source may arrive at the receiving antennas at an angle of arrival $\phi$ that has some nonzero value with respect to the above-mentioned perpendicular bisector. It is thus necessary for the range measuring system to incorporate a separate, dedicated subsystem for measuring the angle of arrival of the source RF radiation, and to compensate the measured time differential in accordance with the magnitude of the measured angle of arrival to obtain the correct range measurement.

One common way of implementing this angle of arrival measurement is to employ a circularly scanning receiving antenna coupled to conventional processing circuitry for determining the angular position of such antenna when the received signal is at maximum strength. The operation of such a subsystem produces an electrical signal representing the angle of arrival $\phi$. Further signal processing is used to develop the proper trigonometric function of the angle $\phi$ such that when multiplied or otherwise combined with the measured time differential $t_{21}$ (during the signal processing that determines the range R) the system automatically compensates for all relative orientations of the source.

An example of a range determining system of the foregoing type is disclosed in application Ser. No. 488,401 entitled SERVO-LOOP PROCESSOR, filed July 15, 1974, by Philip Jones and Moorfield Storey, Jr., now abandoned, and a continuation-in-part of such application, copending as application Ser. No. 80,533 entitled SERVO-LOOP PROCESSOR, filed Oct. 1, 1979, now U.S. Pat. No. 4,316,193.

With this background, it is an object of the present invention to provide a method and apparatus for measuring the range to a scanning source of radiant energy in which the means and steps of performing the angle of arrival measurement are integrated with the same signal receiving and processing circuitry and method steps that yield the range measurement.

Another object of the invention is to eliminate the need for a separate, dedicated angle of arrival measuring subsystem in a range determining system for locating scanning emitters.

An additional object is to provide an accurate, versatile and reliable method and apparatus for determining the angle of arrival of received radiant energy emitted by a scanning source.

SUMMARY OF THE INVENTION

The principles of the invention are embodied in a range measuring method and apparatus that employ an array of three or more receiving devices, such as antennas in the case of radio frequencies, arranged in a predetermined pattern, such as a triangle, so that different pairs of the arrayed devices subtend different angles at a distant scanning source of radiant energy transmission. The array of receiving devices is oriented so as to be generally coplanar with the sweep of the source such that the transmission takes measurable time intervals (sometimes called time differentials) to scan through each of the different, subtended angles. Signal processors are connected to receiving channels associated with the receiving devices for measuring the above noted time differentials, and for producing representative electrical signals. The resulting time differential signals (one for each differently constituted pair of receiving devices) are then processed with constants representing the geometry of the arrayed receiving devices, including such constant parameters as the lengths of the sides and magnitudes of the angles of a triangular array. The processing as described herein yields a signal that varies as a function of the angular direction, at which the source of RF transmission arrives at the receiving array.

More particularly, the angle of arrival signal developed by these signal processors, varies as a predetermined function of the measured time differentials associated with at least two differently constituted pairs of receiving devices. Normally, the timing information from only two pairs of devices is sufficient to accurately determine the angle of arrival. For optimum accuracy, the time differentials used as a basis for the angle of arrival measurement, are taken from those pairs of devices that at the time of the measurement have the greatest broadside relationship to the distant source, and thus, are best able to resolve the time differentials from which the angle of arrival signal is derived.

Preferably, and as provided in the embodiment of the invention disclosed herein, an electrical signal representing the angle of arrival measurement is further processed, with a selected one of the above-mentioned time differential signals, and with another signal representing a measured scan rate $\omega_s$ of the source transmission, to generate an output signal proportional to the range (distance) of the source from the receiving array. Also in such a preferred embodiment, the receiving array is mounted on an airplane, relative to which the angle of arrival and range measurement signals are to be developed, and the individual receiving devices are disposed on the wing tips and on the nose and/or tail of the plane.

To provide a complete disclosure of the invention, reference is made to the appended drawings and following description of one particular and preferred embodiment.

BRIEF DESCRIPTION OF THE DRAWINGS

FIG. 1 is a generalized, block and schematic diagram of the multiple antenna direction finding and ranging system in accordance with the principles of the invention, shown mounted on a monitoring aircraft.

FIG. 2 is a detailed block diagram of one angle of arrival signal processor of the system shown in FIG. 1.

FIG. 3 is another detailed block diagram of a different angle of arrival signal processor of the system shown in FIG. 1.

FIG. 4 is still another detailed block diagram of a third angle of arrival signal processor of the system shown in FIG. 1.

FIG. 8 is a block diagram of one angle of arrival signal processor for a system associated with the more generalized array shown in FIG. 7.

FIG. 9 is a block diagram of another angle of arrival signal processor associated with the array shown in FIG. 7.

DETAILED DESCRIPTION OF THE DRAWINGS

Figure 5:
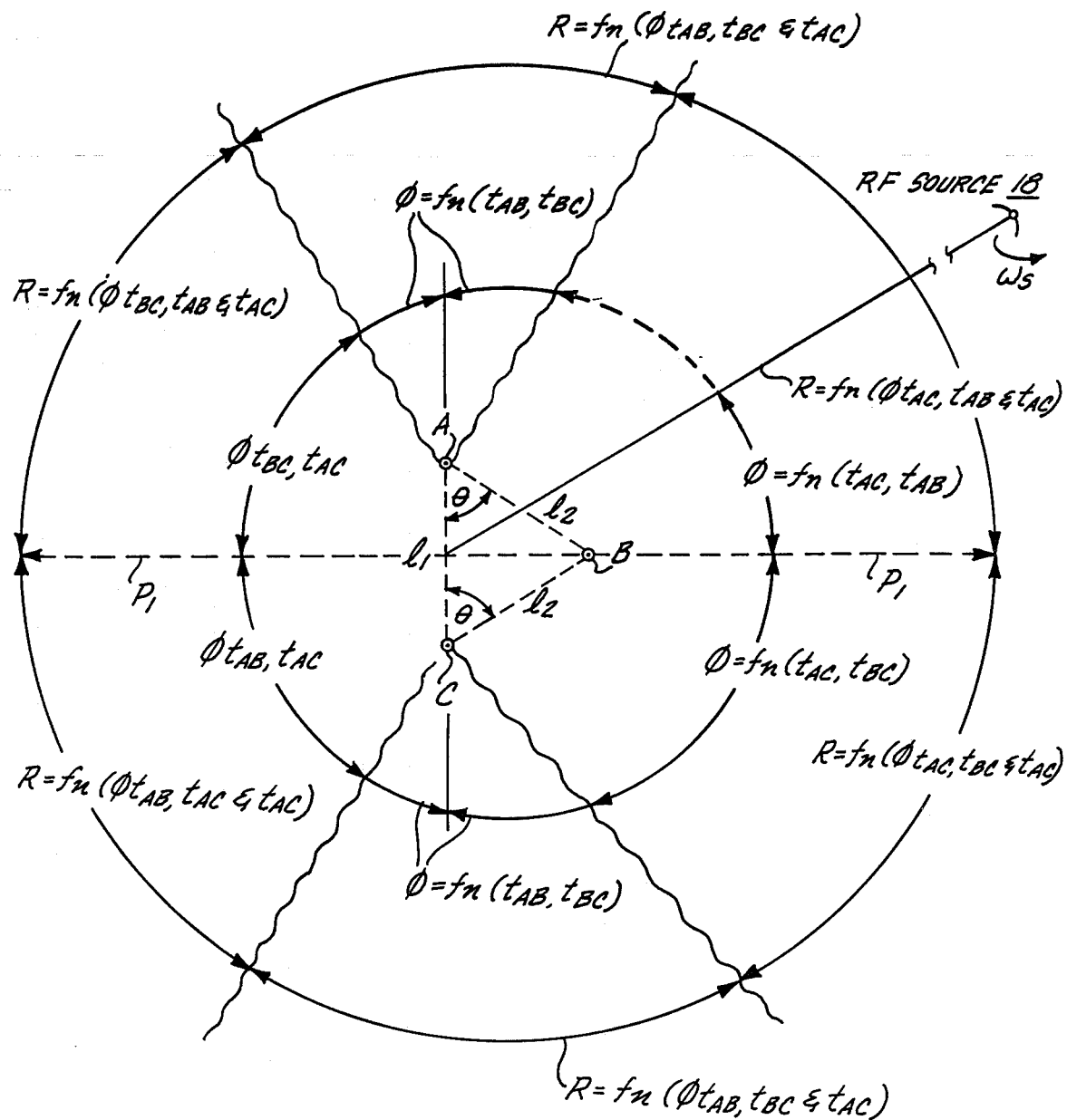
FIG. 5 is a diagram illustrating the angle of arrival and range measurements for locating a source of transmission lying generally forward or generally aft of the monitoring aircraft of FIG. 1.

With reference to FIG. 1, a preferred embodiment of the direction finding and ranging system is shown to include a triangular array of receiving devices, in this instance antennas A, B and C, mounted on a monitoring aircraft 11, and connected via separate channels of a receiving stage 14 to a signal processing stage 16 carried on board aircraft 11. Received signals developed in stage 14 are processed in stage 16 to determine the angle of arrival $\phi$ and the range R of a distant scanning source 18 of transmission. In this embodiment and in most applications of the principles of the invention, it is assumed that the elevations of source 18 and aircraft 11 are substantially less than the azimuthal distance or range R between aircraft 11 and source 18. As such, the scanning beam 20 emitted by source 18 sweeps generally in an azimuthal plane. By disposing the array of receiving antennas A, B and C on the wing tips and nose (or tail) of aircraft 11, and by maintaining the aircraft in a generally horizontal flight, the sweep of beam 20 is generally in the same plane as the antenna array.

While the presently preferred form of the invention is used for locating a scanning source of RF transmission, and hence employs RF antennas A, B and C, as the receiving devices, it will be appreciated that the receiving devices will be selected according to the nature of the source transmission. Thus, the receiving devices may be any type of antennas, sensors, or other transducers suitable for responding to the particular radiant energy emitted by the source whether it is electromagnetic such as RF, infrared, other visible or invisible light, or mechanical such as sound energy waves. Also, while the array of antennas A, B and C is shown mounted on the body of an aircraft in accordance with the preferred embodiment of the invention, the receiving array can alternatively be mounted on any land, sea or space vehicle or transport.

With the above arrangement of the receiving antennas, and the assumed orientation of aircraft 11 relative to source 18, certain physical relationships can be formulated to measure the angle of arrival and range of source 18 using time differentials $t_{AC}$, $t_{AB}$ and $t_{BC}$ associated with the sweep of beam 20 through the small angles subtended at source 18 by the different antenna pairs AC, AB and BC. For example, the time differential $t_{AC}$ is equal to the sweep time of beam 20 through an angle subtended at source 18 by the distance between spaced receiving antennas A and C. Similarly, the time differential $t_{AB}$ corresponds to the sweep of beam 20 through the angle subtended by antennas A and B, and $t_{BC}$ represents the sweep time through the angle subtended by antennas B and C.

At least two such time differential measurements, such as $t_{AC}$ and $t_{AB}$ are processed in stage 16 to determine an angle of arrival $\phi$ between the azimuthal direction of source 18 and an imaginary line formed by the perpendicular bisector $P_1$ of the leg AC of the triangular array. In this case, the perpendicular bisector $P_1$ relative to which the angle of arrival $\phi$ is measured, corresponds to the longitudinal axis of aircraft 11. As the position of distant source 18 changes, moving for example in a 360° panorama about monitoring aircraft 11, signals representing the same angle of arrival $\phi$ (with respect to $P_1$) are derived from different pairs of time differentials such as $t_{AC}$ and $t_{AB}$, $t_{AC}$ and $t_{BC}$, and $t_{AB}$ and $t_{BC}$, selected in the manner described herein to achieve the optimum resolution of $\phi$. The resulting measurement signal $\phi$ is applied to a range processor, which also receives signals representing a measured scan rate $\omega_s$ of source 18, and a constant representing the length $l_1$ of the reference leg AC of the array triangle, to yield a signal proportional to the range R of source 18. In this manner, the array of antennas A, B and C and the associated signal processors cofunction to determine the range, sometimes called ranging, directly from the measured time differentials $t_{AC}$, $t_{AB}$ and $t_{BC}$, without requiring a separate, dedicated subsystem for measuring the angle of arrival $\phi$.

In this embodiment, the array of antennas A, B and C on aircraft 11 is in the shape of an isosceles triangle having one leg between antennas A and C of length $l_1$ and two legs of equal length $l_2$ between antennas A and C and the third antenna B. As mentioned, the angle of arrival $\phi$ is measured relative to the perpendicular bisector $P_1$ of the leg AC, which in this instance coincides with the longitudinal axis of aircraft 11. Since the triangular array forms an isosceles triangle and thereby somewhat simplifies the geometry of the system, it will be appreciated as explained more fully hereinafter, that the principles of the invention are generally applicable to other geometries, including a triangular array of antennas in which none of the sides nor included angles are equal.

Signals received by each of antennas A, B and C are coupled to multi-channel receiving stage 14 which includes a channel A receiver 14A, a channel B receiver 14B and a channel C receiver 14C. Each of the receivers in stage 14 is capable of producing electrical signals in response to the receipt of video pulse trains that are characteristic of radar transmissions.

The resulting signals developed by receiving stage 14 are in turn applied to a set of three separate time differential processors of stage 16 including a $t_{AC}$ processor 30, a $t_{AB}$ processor 32 and a $t_{BC}$ processor 34. While processors 30, 32 and 34 may be provided by any of a number of available circuits that in effect measure the time difference between the receipt of the main portion of source beam 20 as it is aligned first with one antenna and then, after a small delay, with the other of the pair of antennas, a preferred processor circuit is disclosed in copending U.S. application Ser. No. 080,533 filed Oct. 1, 1979, as a continuation-in-part application of U.S. Ser. No. 488,401 filed July 15, 1974, by Philip Jones and Moorfield Storey for SERVO-LOOP PROCESSOR. Each of the processors 30, 32 and 34 receives a different pair of output signals developed by the receivers of stage 14. Thus, processor 30 receives the output signals from channel A receiver 14A and channel C receiver 14C, and produces a signal representing the time differential $t_{AC}$ associated with the sweep of beam 20 through an angle subtended at source 18 by the triangle leg AC. Similarly, processor 32 processes the outputs from channel A receiver 14A and channel B receiver 14B and produces a signal representing $t_{AB}$, and processor 34 is responsive to the channel B receiver 14B and channel C receiver 14C to produce a time differential signal $t_{BC}$.

Additionally, one of the receiving channels, in this instance channel A receiver 14A has its output connected to the input of a scan rate detector 36, of known construction and operation, for sensing the frequency at which beam 20 scans through antenna A on aircraft 11. Detector 36 thus detects and produces a signal representing a scan rate $\omega_s$ of source 18.

In response to the various time differential signals $t_{AC}$, $t_{AB}$ and $t_{BC}$, a set of separate angle of arrival processors 40, 42 and 44 each compute the same angle of arrival $\phi$, but based on different pairs of time differential input signals. Thus, processor 40 receives the time differentials $t_{AC}$ and $t_{AB}$ associated with the scanning of beam 20 through the antenna pairs A, C and A, B. Processing these variables with a set of constants $l_1$, $l_2$, and $\theta$ representing the dimensions and configuration of the antenna array triangle, processor 40 produces at an output thereof, a signal representing the angle of arrival $\phi$ as a function of $t_{AC}$ and $t_{AB}$. The signal manipulations performed by processor 40 are described more fully below as being based on a relationship between the angle $\phi$ and the input parameters derived by solving a set of simultaneous equations for the range R.

Similarly, a second angle of arrival processor 42 receives as input variables, the time differentials $t_{AC}$ and $t_{BC}$, and combines these variables with the constants $l_1$, $l_2$ and $\theta$. From these inputs, processor 42 develops a signal representing the same angle of arrival $\phi$, as produced by processor 40, except in this instance the signal is derived from the time differentials $t_{AC}$ and $t_{BC}$.

The third angle of arrival processor 44 receives signals representing $t_{AB}$ and $t_{BC}$, and a constant representing the angle $\theta$, and produces an output signal representing the same angle of arrival $\phi$, but measured in this case in response to $t_{AB}$ and $t_{BC}$.

Once the angle of arrival $\phi$ has been measured by one or more of processors 40, 42 and 44, the resulting angle signal is applied along with the time differential $t_{AC}$ to a range processor 50, known per se, for yielding a signal proportional to the range R. In particular, processor 50 produces a signal representing the range R, in a manner known per se, by combining according to a predetermined relationship, the following factors: distance $l_1$ between spaced-apart antennas A and C; the measured angle $\phi$ referenced to the perpendicular bisector $P_1$ of leg AC; the time differential $t_{AC}$; and, the scan rate $\omega_s$ of source 18. This known relationship is:

$$R = \frac{l_1 \cos \phi}{t_{AC} \omega_s} \quad (1)$$

With processor 50 operated to measure the range R with reference to the leg AC, it will be supplied with signals representing the time differential $t_{AC}$ and the angle of arrival $\phi$ referenced to the perpendicular bisector $P_1$ of leg AC. In this case and as shown in FIG. 1, the signal representing time differential $t_{AC}$ developed by processor 30 is continuously supplied as one input signal to range processor 50. However, the input for $\phi$, being the angle of arrival, can be provided by any one of the signal outputs of processors 40, 42 and 44, inasmuch as each of these processors produces a signal representing the same angle. Thus in FIG. 1, while a solid line connects the output of processor 40 to the angle $\phi$ input of range processor 50, it will be understood that this angle input can be alternatively supplied by the output of processor 42 in the form of $\phi t_{AC}$, $t_{BC}$, or the output of processor 44 in the form of $\phi t_{AB}$, $t_{BC}$ as indicated by the dotted lines connecting these outputs to processor 50, or alternatively by the output of a processor that averages all three of the angle measurements $\phi t_{AC}$, $t_{AB}$, $\phi t_{AC}$, $t_{BC}$, and $\phi t_{AB}$, $t_{BC}$.

Preferably, and as more fully described hereinafter in connection with a preferred form of the invention, the angle of arrival processor for supplying the measured angle $\phi$ to the range processor 50 is selected according to the following criteria. By using the measured angle $\phi$ from that one of processors 40, 42 or 44 derived from the two largest time differential measurements among $t_{AC}$, $t_{AB}$ and $t_{BC}$, the best resolution of the range R is obtained. This can be understood by observing that the best resolution of the angle $\phi$ occurs when measured from time differentials that are taken when source 18 has the greatest broadside relationship to the associated pair of antennas. In most cases, by using a set of two time differentials, both measured when source 18 lies relatively broadside to the corresponding pairs of antennas, optimum results are obtained in accurately determining the angle $\phi$ and hence the range R. Since the receiving antenna array is in the form of a triangle, it is of course impossible for source 18 to be in a position that lies exactly broadside to two pairs of antennas. However, it will also be appreciated that by using the time differentials from two pairs of antennas where there is a substantial braodside relationship, and hence disregarding the time differential from that pair of antennas which is generally aligned with the source, i.e., where the time differential approaches zero, best resolution of the angle of arrival and the derivative range are achieved.

Processors 40, 42 and 44 are based on the above-mentioned relationship between the various time differentials $t_{AC}$, $t_{AB}$ and $t_{BC}$ and the geometry of the source 18, beam 20, triangular array of antennas A, B and C, and the angle of arrival $\phi$ measured relative to the perpendicular bisector of one of the legs of the triangle. In this embodiment, the antenna array forms an isosceles triangle. $\phi$ is measured with respect to side AC, being of length $l_1$. The angle $\theta$ is subtended by the two equal sides AB and BC of equal length $l_2$. The parameters of the foregoing geometrical relationship are based on the assumption that source 18, beam 20 and the triangle formed by antennas A, B and C are in a common plane. Under these conditions, the range R can be related to each of the sides of the array triangle using the above cited formula. Thus with respect to the side AC the range is determined from the above formula (1).

The same range R computed with reference to the side AB is:

$$R = \frac{l_2 \cos(\theta - \phi)}{t_{AB}\omega_s} \quad (2)$$

And R computed with respect to side BC is:

$$R = \frac{l_2 \cos(\theta + \phi)}{t_{BC}\omega_s} \quad (3)$$

The angular quantities $(\theta - \phi)$ and $(\theta + \phi)$ represent the arrival angles with respect to the sides AB and BC. The quantities, $l_1$, $l_2$ and $\theta$ are known, and in this embodiment, they are constants. The time differentials and scan rate, are measurable using the above-described components. Since all three of the above relationships define the same range R, different pairs of these equations can be used to eliminate the unknown variable R, and compute the angle of arrival $\phi$ based on the known or measurable quantities of $l_1$, $l_2$, $\phi$, $\omega_s$ and the time differentials $t_{AC}$, $t_{AB}$ and $t_{BC}$.

Thus from equations (1) and (2):

$$\phi\, t_{AC},\, t_{AB} = \tan^{-1}\left(\frac{t_{AB}l_1 \csc\theta}{t_{AC}l_2} - \ctn\theta\right) \quad (4)$$

From equations (1) and (3):

$$\phi\, t_{BC},\, t_{AC} = \tan^{-1}\left(\frac{-t_{BC}l_1 \csc\theta}{t_{AC}l_2} + \ctn\theta\right) \quad (5)$$

And finally from equations (2) and (3):

$$\phi\, t_{AB},\, t_{BC} = \tan^{-1}\left(\frac{t_{AB} - t_{BC}}{t_{AB} + t_{BC}} \ctn\theta\right) \quad (6)$$

It is observed that although the angle $\phi$ is based in the foregoing equations on different pairs of time differentials $t_{AC}$, $t_{AB}$ and $t_{BC}$, the angle is still the same in each case and is always measured relative to the perpendicular bisector $P_1$ of the side AC. As will be described in greater detail hereinafter, similar relationships exist for the angles of arrival measured with respect to the perpendicular bisectors $P_2$ and $P'_2$ of the remaining sides so as to allow for accurate angle of arrival and range measurements for locating a source 18 that may be in any position within a 360° circle around aircraft 11.

With reference to FIG. 2, angle of arrival processor 40 determines the angle of arrival $\phi$ as a function of the time differential $t_{AC}$ and $t_{AB}$ by processing signals representative thereof through a series of analog computation circuits including: a pair of variable gain amplifiers 401 and 402, divider 403, cosecant function generator 404, multiplier 406, cotangent function generator 407, subtractor 408 and an inverse tangent function generator 409.

Variable gain amplifiers 401 and 402 have control inputs which are respectively responsive to reference signals representing the lengths of the sides of the triangle, namely $l_1$ and $l_2$ and amplify the time differentials $t_{AB}$ and $t_{AC}$ to respectively produce the quantities $l_1 t_{AB}$ and $l_2 t_{AC}$. It will be appreciated that in most applications, the distances $l_1$ and $l_2$ will be fixed and thus these variable gain amplifiers 401 and 402 may be replaced by fixed gain amplifiers in which the gain has been selected to reflect the constant factors of $l_1$ and $l_2$.

Divider 403 divides the quantity $t_{AB}l_1$ by $t_{AC}l_2$ and multiplier 406 multiplies the signal representing this quotient by another signal produced by function generator 404 representing the value of the cosecant of the angle $\theta$. Since in this embodiment and in most applications, the angle $\theta$ will be fixed, function generator 404 and multiplier 406 may be replaced by a fixed gain amplifier that produces a signal representing the output quotient from divider 403 increased or diminished by the constant value of the cosecant of $\theta$.

Subtractor 408 subtracts from the signal produced by multiplier 406, a quantity representing the cotangent of $\theta$ developed by a function generator 407. Where the angle $\theta$ is a constant value, as in this embodiment, it may be replaced by a signal source of constant value fed as one input into subtractor 408 from which a signal representing the quantity $t_{AB}l_1$ divided by $t_{AC}l_2$ times cosecant $\theta$ minus cotangent $\theta$ is produced. Function generator 409 transforms this input signal into a signal representing the angle of arrival $\phi$ as a function of $t_{AC}$ and $t_{AB}$.

Similarly, angle of arrival processor 42 processes the signal variables $t_{AC}$ and $t_{BC}$, along with signals representing $l_1$ and $l_2$ to produce the same angle of arrival $\phi$, but in this instance measured as a function of $t_{AC}$ and $t_{BC}$. Thus processor 42 includes a pair of variable gain amplifiers 421 and 422 (corresponding to the above described variable gain amplifiers 401 and 402 of processor 40), a divider 423 (corresponding to the above described divider 403), a cosecant function generator 424 (corresponding to generator 404 above), an inverter 425, a multiplier 426, an adder 428 and a sine function generator 427, and lastly an inverse tangent function generator 429. As described above in connection with processor 40, angle of arrival processor 40 may be modified to simplify some of the signal processing where the quantities $l_1$, $l_2$ and $\theta$ are fixed, rather than variable.

With reference to FIG. 4, angle processor 44 processes the time differential signals $t_{AB}$ and $t_{BC}$, and a signal representing the angle $\theta$ to develop an output signal representing the same angle of arrival $\phi$, but in this case as a function of the time differential signals $t_{AB}$ and $t_{BC}$. For this purpose, processor 44 includes a subtractor 441 and an adder 442, a divider 443, a cotangent function generator 444 and a multiplier 446.

Subtractor 441 and adder 442 both receive the signals $t_{AB}$ and $t_{BC}$ and produce the difference and sum signals respectively of these signal quantities. Divider 443 divides the difference $t_{AB} - t_{BC}$ by the sum $t_{AB} + t_{BC}$. The signal representing this quotient is multiplied by the output function of cotangent $\theta$ from generator 444 by multiplier 446 to yield the signal representing the angle $\phi$ as a function of $t_{AB}$ and $t_{BC}$. As described above in connection with processors 40 and 42, the signal processing by processor 44 may be simplified where $\theta$ is a constant, as in this embodiment, by replacing generator 444 and multiplier 446 by a constant gain amplifier having a gain adjusted to reflect the increase or diminishment of the quotient signal by the factor cotangent $\theta$.

While each of the signal quantities produced by processors 40, 42 and 44 represent the same angle of arrival $\phi$ as shown in FIG. 1 referenced to the perpendicular bisector $P_1$ of leg AC, it will be appreciated that the resolution of these signal outputs varies significantly depending on the magnitude of the time differential signals $t_{AB}$, $t_{AC}$ and $t_{BC}$. This characteristic of the system is illustrated by the diagram in FIG. 5 depicting how the angle of arrival $\phi$ and the range R are determined from different pairs of time differentials as the location of source 18 moves in a 360° circle around the triangular array of antennas A, B and C. When source 18 is in the upper righthand region as shown in the diagram of FIG. 5, the best resolution for $\phi$ and R are obtained by using the time differentials $t_{AC}$ and $t_{AB}$. The time differentials from the antenna pairs AB and AC result from a substantially broadside relationship between the direction of arrival of the transmission from source 18 and the associated legs of the triangle between these pairs of antennas. In contrast, it is noted that the position of source 18 with respect to the antenna pair B and C is one of near alignment, resulting in a low resolution time differential $t_{BC}$.

As the position of source 18 moves in a counterclockwise direction as depicted in FIG. 5 into a region that is substantially off the wing of the receiving aircraft and thus nearly aligned with the antenna pair AC, best resolution of the angle of arrival $\phi$ is obtained by using the processor that determines the angle as a function $t_{AB}$ and $t_{BC}$, ignoring the time differential $t_{AC}$. In this region it will be noted that the greatest broadside relationship occurs between source 18 and the antenna pairs A,B and B,C. Also it will be observed that in this region the angle $\phi$ measured with respect to the forward projection of the perpendicular $P_1$ approaches 90°, and the tange of $\phi$ approaches infinity. However, in this same region, the resolution of the range R suffers because $t_{AC}$ approaches zero. For this region, and the corresponding region on the opposite side of the aircraft, a preferred ranging measurement is effected by using an angle of arrival $\phi$ referenced to another perpendicular bisector associated with either of leg AB or leg BC of the triangle. For this purpose, and as more fully described below in connection with FIGS. 7-10, a plurality of sets of angle of arrival processors may be employed, each referenced to a different perpendicular bisector, and the set of processors yielding the most optimum angle of arrival measurement for ranging purposes may then be selected for developing the range signal R.

As the position of source 18 moves further in the counterclockwise direction beyond the 90° angle position, the signal representing the angle $\phi$ begins to diminish from 90° and now becomes referenced to the rearward projection of the perpendicular bisector $P_1$.

Further counterclockwise movement of source 18 brings the source position into a region nearly aligned with the antenna pair AB and the angle of arrival $\phi$ and range R are now measured from the time differentials $t_{AC}$ and $t_{BC}$ as these antenna pairs now have the greatest broadside relationship. Thus, the range R in the upper left-hand region of the FIG. 5 diagram is measured as a function of $\phi t_{BC}$, $t_{AB}$ and the time differential $t_{AC}$.

The angle of arrival and range measurements for the lower regions of the diagram of FIG. 5 follow by reciprocity from the above description. As the source 18 moves across the forward or rearward projection of the perpendicular bisector $P_1$, there is a sign change in the angle of arrival signal $\phi$ as it passes through a zero value. Thus, the sign of the resulting signal indicates which side of the perpendicular bisector that the source 18 lies.

Figure 6:
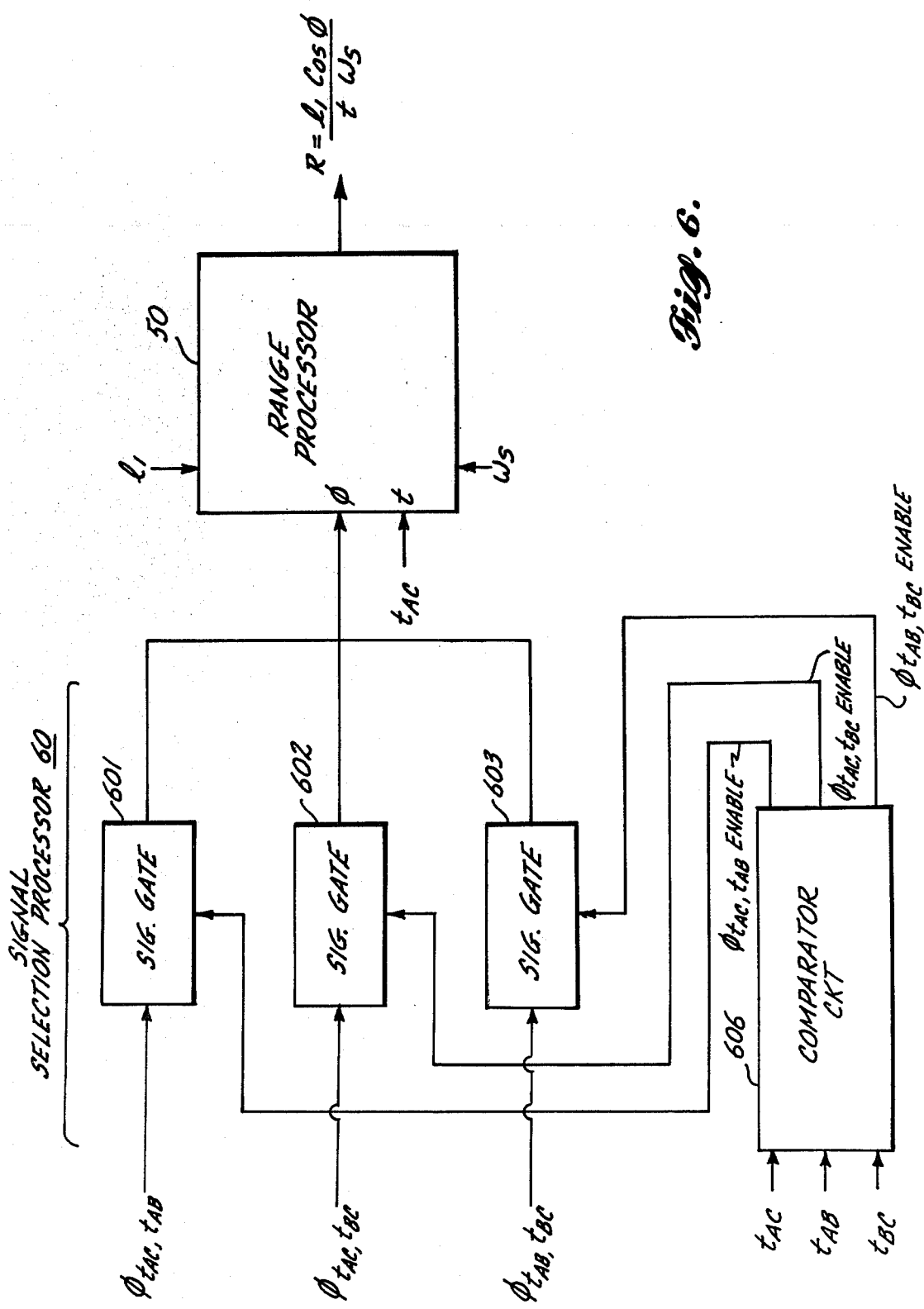
FIG. 6 is a block diagram of a signal selection processor for use in combination with the direction finding and ranging system shown in FIG. 1.

As mentioned above, it is preferable to provide with the various processors of FIG. 1, a signal selection processor for automatically determining and using that one of the angle of arrival signals $\phi t_{AC}$, $t_{AB}$; $\phi t_{AC}$, $t_{BC}$ or $\phi t_{AB}$, $t_{BC}$ having the greatest resolution. With reference to FIG. 6, a signal selection processor 60 is interposed between the outputs of angle of arrival processors 40, 42 and 44 and the range processor 50. Processor 60 includes a set of three signal gates 601, 602 and 603 that have their separate inputs respectively connected to the outputs of processors 40, 42 and 44, and a comparator circuit 606 that has a set of three signal inputs connected to the time differential signal outputs from processors 30, 32 and 34 of FIG. 1. The outputs of gates 601, 602 and 603 are combined and jointly connected to the angle of arrival $\phi$ input of range processor 50, and a set of three enable outputs $\phi t_{AC}$, $t_{AB}$ enable, $\phi t_{AC}$, $t_{BC}$ enable and $\phi t_{AB}$, $t_{BC}$ enable of comparator circuit 606 are separately and respectively connected to a control input of gates 601, 602 and 603. Comparator circuit 606 compares the three time differential signals $t_{AC}$, $t_{AB}$ and $t_{BC}$ using well known comparator circuitry and automatically determines at any given instance, which of the three input signals has the lesser absolute magnitude. The time differential input signal having the lowest magnitude thereupon causes a gate opening output signal to be produced at that particular enable output which is associated with the remaining pair of time differential signals. Thus if comparator circuit 606 determines that $t_{BC}$ is less than either $t_{AC}$ or $t_{AB}$, circuit 606 automatically issues an enable signal at the $\phi t_{AC}$, $t_{AB}$ enable output. Responsivey, signal gate 601 is opened allowing the angle of arrival $\phi t_{AC}$, $t_{AB}$ output from processor 40 to be applied to the $\phi$ input of range processor 50 along with the time differential $t_{AC}$.

Figure 7:
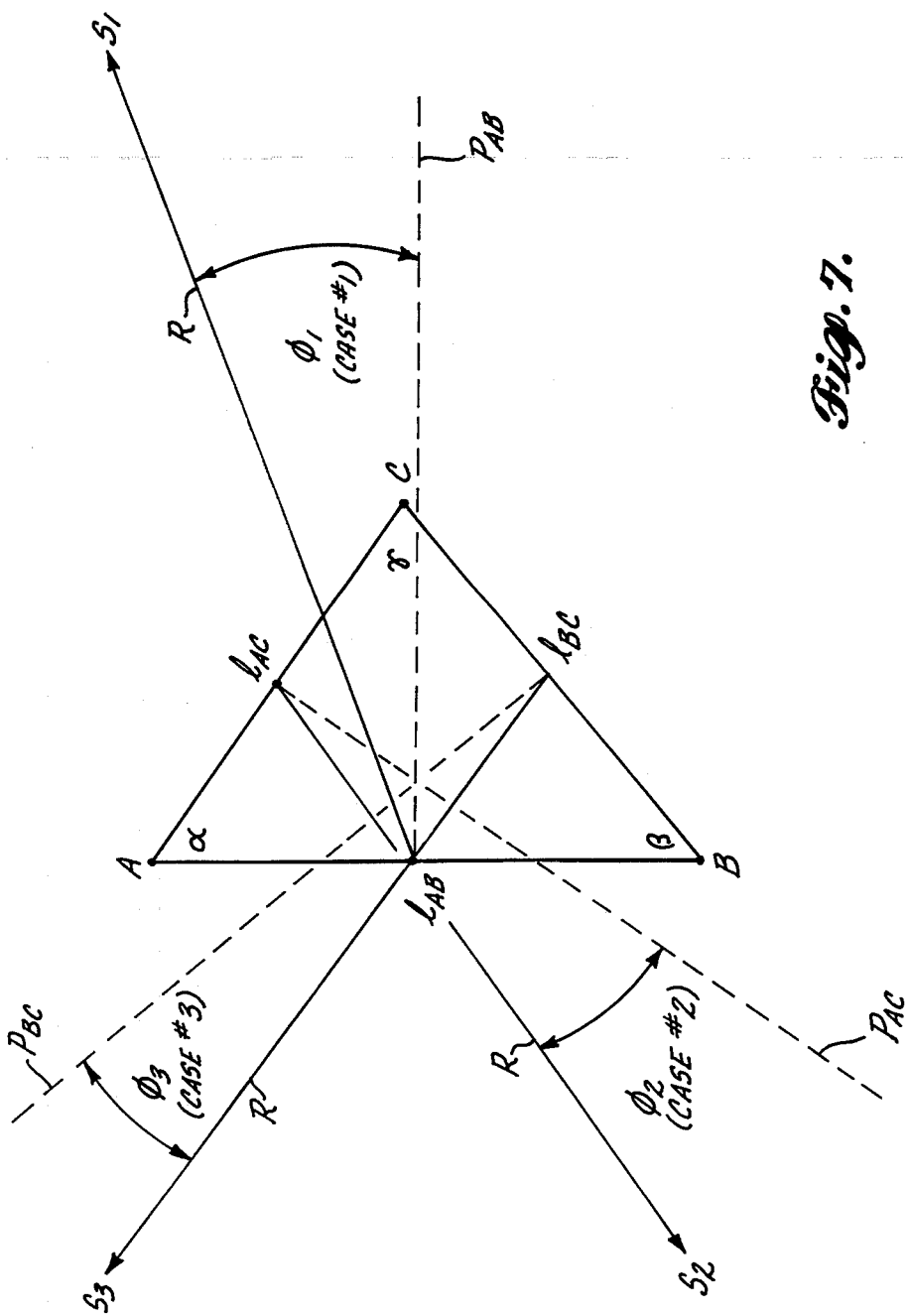
FIG. 7 is a diagram of a triangular array of antennas used in combination with a more generalized angle of arrival and range measuring system which is not constrained to a particular triangular configuration.

The embodiment of the invention described above in connection with FIGS. 1-6 is limited to the special case in which the array of receiving antennas A, B and C are arranged in an isosceles triangle as illustrated by FIG. 1. A more general application of the principles of the invention is disclosed by referring to the more general triangular array of antennas A, B and C as shown in FIG. 7. In that FIGURE, the triangle formed by the antenna array includes the three sides $l_{AB}$, $l_{AC}$ and $l_{BC}$, and the associated included angles $\alpha$, $\beta$ and $\gamma$. For the purpose of disclosing the most generalized application of the invention, it will be assumed that none of the legs of the triangle are equal and hence none of the included angles are equal. It will further be assumed in connection with FIG. 7, that it is desirable to measure the angle of arrival $\phi$ with respect to each of the three different perpendicular bisectors associated with the three legs of the triangle. These perpendicular bisectors are designated by the reference letters $P_{AB}$ for the perpendicular bisector of leg $l_{AB}$, $P_{AC}$ for the perpendicular bisector associated with leg $l_{AC}$, and $P_{BC}$ for the perpendicular bisector for $l_{BC}$. It will be appreciated that a series of equations may be generated by pairing equations to eliminate the unknown variable R, in the manner described above in connection with equations (4), (5) and (6), to yield an angle of arrival $\phi$ measurement for a transmission source referenced to each of the three different perpendicular bisectors $P_{AB}$ (referred to as case #1), $P_{AC}$ (case #2) and $P_{BC}$ (case #3). Moreover, the measured angle of arrival $\phi$ for each case, has three separate solutions, as in the case of the three different functions (equations (4), (5) and (6), supra) for determining the angle of arrival $\phi$ with respect to the perpendicular bisector $P_1$ in FIG. 1. Thus in FIG. 7, a source $S_1$ has an angle of arrival $\phi_1$ with reference to perpendicular bisector $P_{AB}$ that can be measured by any one of three different functions relating $\phi_1$ to different pairs of time differentials $t_{AB}$, $t_{AC}$ and $t_{BC}$ and the various length and angle dimensions of the tirangular array. The measurement of angle $\phi_1$ is referred to as case #1 and is obtained by using the following set of three equations, generated in the above-described manner:

$$\phi_1 = \tan^{-1}\left(\frac{l_{AB}t_{BC}\csc\beta}{t_{AB}l_{BC}} - \operatorname{ctn}\beta\right) \quad (7)$$

$$\phi_1 = \tan^{-1}\left(\operatorname{ctn}\alpha - \frac{l_{AB}t_{AC}\csc\alpha}{t_{AB}l_{AC}}\right) \quad (8)$$

$$\phi_1 = \tan^{-1}\left(\frac{l_{AC}t_{BC}\cos\alpha - l_{BC}t_{AC}\cos\beta}{l_{BC}t_{AC}\sin\beta + l_{AC}t_{BC}\sin\alpha}\right) \quad (9)$$

Similarly, for case #2, the angle of arrival $\phi_2$ measured with respect to the perpendicular bisector $P_{AC}$ is obtained by using any one of three different formulas based on different pairs of time differentials and the dimensions of the triangle. The equations for $\phi_2$ for case #2 are as follows:

$$\phi_2 = \tan^{-1}\left(\frac{l_{AC}t_{AB}\csc\alpha}{t_{AC}l_{AB}} - \operatorname{ctn}\alpha\right) \quad (10)$$

$$\phi_2 = \tan^{-1}\left(\operatorname{ctn}\gamma - \frac{l_{AC}t_{BC}\csc\gamma}{t_{AB}l_{BC}}\right) \quad (11)$$

$$\phi_2 = \tan^{-1}\left(\frac{l_{BC}t_{AB}\cos\gamma - l_{AB}t_{BC}\cos\alpha}{l_{AB}t_{BC}\sin\alpha + l_{BC}t_{AB}\sin\gamma}\right) \quad (12)$$

Finally, the angle of arrival $\phi_3$ is referred to as case #3 and the measured angle is referenced to the perpendicular bisector $P_{BC}$ associated with leg $l_{BC}$. The applicable functions for the three different ways of determining $\phi_3$ are:

$$\phi_3 = \tan^{-1}\left(\frac{l_{BC}t_{AC}\csc\gamma}{t_{BC}l_{AC}} - \operatorname{ctn}\gamma\right) \quad (13)$$

$$\phi_3 = \tan^{-1}\left(\operatorname{ctn}\beta - \frac{l_{BC}t_{AB}\csc\beta}{t_{BC}l_{AB}}\right) \quad (14)$$

$$\phi_3 = \tan^{-1}\left(\frac{l_{AB}t_{AC}\cos\beta - l_{AC}t_{AB}\cos\gamma}{l_{AC}t_{AB}\sin\gamma + l_{AB}t_{AC}\sin\beta}\right) \quad (15)$$

Figure 10:
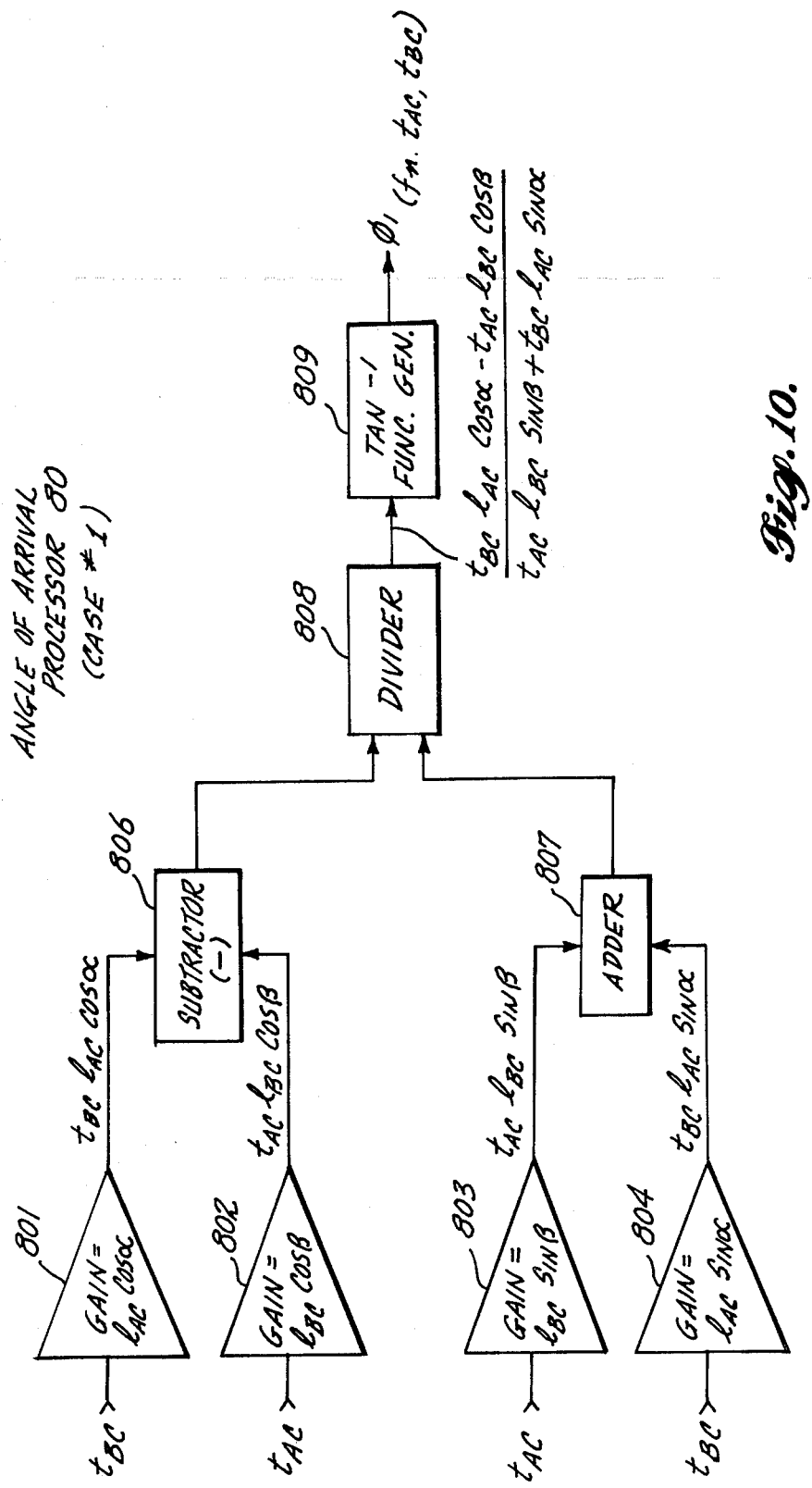
FIG. 10 is a further block diagram of still another angle of arrival signal processor associated with the array shown in FIG. 7.

FIGS. 8, 9 and 10 depict analog signal processors for developing electrical signals representing the three possible ways of determining the angle of arrival $\phi_1$ as it is shown in FIG. 7. In constructing these various signal processors, it is assumed that the array of antennas A, B and C are mounted at a fixed relative spacing, such as on an aircraft as shown in FIG. 1, and that the length of the sides $l_{AB}$, $l_{AC}$ and $l_{BC}$ are fixed, as are the included angles $\alpha$, $\beta$ and $\gamma$. With the assumption, the signal processors shown in FIGS. 8, 9 and 10 are simplified significantly by using constant gain amplifiers or constant level signal sources for the parameters $l_{AB}$, $l_{AC}$, $l_{BC}$, and $\alpha$, $\beta$ and $\gamma$.

Thus in FIG. 8, a first signal processor 61 is provided for measuring angle of arrival $\phi_1$ of case #1 as a function of the time differentials $t_{AB}$ and $t_{BC}$, which may be obtained for example from the time differential processors 32 and 34 of FIG. 1. Processor 61 as shown in FIG. 8 includes a pair of fixed gain amplifiers 610 and 612 having their inputs separately connected to receive time differential signals $t_{BC}$ and $t_{AB}$, respectively; a divider 613 having inputs connected to receive the outputs of amplifiers 610 and 612; a subtractor 614 for subtracting a fixed level signal representing the $\operatorname{ctn}\beta$ from the signal output from divider 613; and an inverse tangent function generator 616 having its input connected to the output of subtractor 614.

The gain of amplifier 610 is selected to multiply the signal of $t_{BC}$ by a constant factor equal to $l_{AB}\csc\beta$, and the gain of amplifier 612 is set to multiply the signal $t_{AB}$ by a factor $l_{BC}$. Divider 613 divides the output signal from amplifier 610 by the output signal from amplifier 612 to yield a signal representing the quantity $t_{BC}l_{AB}\csc\beta$ divided by $l_{BC}t_{AB}$. Subtractor 614 subtracts from the divider output signal, a fixed signal level representing $\operatorname{ctn}\beta$. The signal output from subtractor 614 is then applied to an input of the inverse tangent function generator 616 which produces an output signal representing that particular angle $\phi_1$, the tangent of which is equal to the value represented by the input signal to generator 616. It is observed that the angle output $\phi_1$ signal is a function of the time differentials $t_{AB}$ and $t_{BC}$ and is referenced to perpendicular bisector $P_{AB}$.

The output signal from processor 61, representing the angle of arrival $\phi_1$, may now be applied along with a signal representing the associated time differential $t_{AB}$, as inputs to a range processor, such as processor 50 shown in FIG. 1, along with signals representing $l_{AB}$ and $\omega_s$, to yield a signal representing the range R to a source $S_1$ (see FIG. 7).

In FIG. 9, a second angle of arrival processor 70 is shown, also for measuring the angle of arrival $\phi_1$ (for case #1) relative to the perpendicular bisector $P_{AB}$ (see FIG. 7). Processor 70 measures the angle of arrival $\phi_1$ as a function of the pair of time differentials $t_{AB}$ and $t_{AC}$ and for this purpose includes a pair of fixed gain amplifiers 701 and 702; a divider 703; a subtractor 704; and an inverse tangent function generator 706. The gain of amplifier 701 is selected to multiply a signal representing the time differential $t_{AC}$ by a fixed quantity $l_{AB}$ csc $\alpha$ and the gain of amplifier 702 is set to multiply the $t_{AB}$ signal by a factor of $l_{AC}$. The output signals from amplifier 701 and 702 are fed to divider 703 which produces an output signal representing the quotient of these input signals or $t_{AC} l_{AB}$ csc $\alpha$ divided by $l_{AC} t_{AB}$. Subtractor 704 subtracts a fixed signal level representing ctn $\alpha$ from the level of the output signal from divider 703, and the resulting signal at the output of subtractor 704 is converted by the inverse tangent function generator 706 to a signal representing the angle whose tangent is equal to the output of subtractor 704. The output signal $\phi_1$ of processor 70 is a function of the variables $t_{AB}$ and $t_{AC}$, and may be applied along with the associated time differential $t_{AB}$ for leg $l_{AB}$ as inputs to a range processor for producing a signal measurement of the corresponding range R, as described above in connection with processor 61 of FIG. 8.

FIG. 10 shows a block diagram of a third angle of arrival processor 80, also based on case #1 and providing an output signal representing the angle of arrival $\phi_1$ as a function of $t_{AC}$ and $t_{BC}$. For this purpose, processor 80 has two sets of fixed gain amplifiers including a first set of amplifiers 801 and 802 respectively connected to receive input signals representing $t_{BC}$ and $t_{AC}$, and a second set of fixed gain amplifiers 803 and 804 respectively connected to receive input signals representing $t_{AC}$ and $t_{BC}$. A subtractor 806 is connected to the outputs of amplifiers 801 and 802 and an adder 807 is connected to the outputs of amplifiers 803 and 804; a divider 808 has two inputs connected to receive the outputs of subtractor 806 and adder 807, and the quotient signal from divider 808 is applied as an input signal to an inverse tangent function generator 809 which in turn has an output producing a signal representing the desired angle of arrival $\phi_1$.

The gain of amplifier 801 is selected to equal a fixed value representing $l_{AC}$ csc $\alpha$ to produce a signal quantity representing $t_{BC} l_{AC}$ csc $\alpha$; and the gain of amplifier 802 is set to equal a factor $l_{BC}$ csc $\beta$ which produces a signal quantity $t_{AC} l_{BC}$ csc $\beta$. Subtractor 806 subtracts these signal levels and applies the result as one input signal to divider 808.

The gain of amplifier 803 is set at $l_{BC} \sin \beta$ to produce a signal $t_{AC} l_{BC} \sin \beta$; and the gain of amplifier 804 is set at $l_{AC} \sin \alpha$ to produce the signal quantity $t_{BC} l_{AC} \sin \alpha$. These signals are added by adder 807 and the resulting summation signal is applied as the other input to divider 808. The signal quotient from divider 808 represents $t_{BC} l_{AC}$ csc $\alpha - t_{AC} l_{BC}$ csc $\beta$ divided by $t_{AC} l_{BC} \sin \beta + t_{BC} l_{AC} \sin \alpha$ and when applied as an input to function generator 809, causes a signal to be produced at the output thereof that represents the angle of arrival $\phi_1$, the tangent of which is equal to the output signal from divider 808. The resulting signal $\phi_1$ is measured as a function of the time differentials $t_{AC}$ and $t_{BC}$.

The output signal $\phi_1$ from processor 80, may be applied along with a signal representing the time differential $t_{AB}$ of the associated triangle leg $l_{AB}$ as inputs to a range processor in the manner described above in connection with processor 61, to yield a signal measurement of the range R referenced to the midpoint of leg AB.

As in the embodiment described above in connection with FIGS. 1-6, the output signals from the three different angle of arrival processors 61, 70 and 80, may be selectively applied to a range processor to achieve the optimum resolution, or the outputs may be averaged and then applied with the $t_{AB}$ signal to a range processor.

While FIGS. 8, 9 and 10 depict block diagrams of processors suitable for measuring the angle $\phi_1$ pursuant to case #1, it will be appreciated that the processors for each of angle of arrival $\phi_2$ and $\phi_3$ according to case #2 and #3 are essentially the same, only the input parameters and gains of the amplifiers need be changed. Thus the same basic components may be provided for processing and hence measuring the various solutions for the angle $\phi_2$ and $\phi_3$ pursuant to case #2 and case #3 referred to above in connection with FIG. 7.

In some applications of the invention it will be preferable to convert the input signals to the angle of arrival and range processors to digital form, and process these signals digitally using either special purpose digital circuitry, or a programed general purpose computer, such as a microprocessor based computer. In such case, and as will be quickly recognized by those skilled in the art, the above disclosed analog computation components of FIGS. 2-4 and 8-10 will be replaced by equivalent digital processors or processing.

Thus it will be seen that the foregoing disclosed embodiments of the invention provide method and apparatus for passive ranging of a distant scanning source of RF transmission, such as a radar emitter, in which an array of three or more antennas and associated signal processors are effective to produce a measurement signal of the angle of arrival of the emitter without requiring a separate, dedicated angle of arrival measurement subsystem. The same time differential signals which are processed to yield an angle of arrival measurement, are on a selective basis, further processed with a resulting angle of arrival signal to produce a measurement of the range R between the antenna array and the emitter.

In using the method and apparatus as disclosed above, it will be appreciated that there are certain relative geometrical orientations between the source and the antenna array which, depending upon the particular time differentials used as inputs, does not yield optimum angle of arrival and ranging accuracy. For this purpose, it is desirable to change the pair of time differentials that are employed to measure the angle of arrival as the emitter moves relative to the array and the direction of arrival changes. In one above described embodiments, the two largest time differentials are selected for this purpose. Furthermore, even though the two largest time differentials are selected, there are some geometrical relationships which require still a further signal selection criteria in order to obtain optimum ranging measurements. For example in those situations in which the emitter becomes aligned with the particular leg of the triangle that is used as a reference, then it will be appreciated that the associated time differential for the corresponding antenna pair approaches zero. In such case, it becomes impractical to accurately resolve the range measurement. When this occurs, it is necessary to select a perpendicular bisector of a different leg of the triangle, and measure the angle of arrival and thereafter the range with reference to the newly selected bisector. For example, in FIG. 7, if the position of source $S_1$ moved in a counterclockwise direction as viewed in FIG. 7 to a position aligned with the antenna pair AB, then it would no longer be desirable to measure the range R using the angle of arrival $\phi_1$ and the time differential $t_{AB}$ inasmuch as $t_{AB}$ now approaches zero. Accordingly, the angle of arrival $\phi_1$ based on case #1 are ignored and the signal processing is carried out using $\phi_2$ of case #2 or $\phi_3$ of case #3 using the perpendicular bisectors $P_{AC}$ and $P_{BC}$, respectively. Note that the angle of arrival measurements will be accurate so long as the two largest time differentials are used, and from the thusly determined direction of arrival, the most appropriate triangle leg or legs for ranging can be selected, ignoring the range measurement referenced to the leg which has the greatest alignment with source direction.

While only particular embodiments of the invention have been disclosed herein, it will be readily apparent to persons skilled in the art that numerous changes and modifications can be made thereto including the use of equivalent means, devices and method steps, without departing from the spirit of the invention. For example, the principles of the invention are applicable to method and apparatus for locating any source of scanning radiant energy, whether electromagnetic (e.g., RF, light, etc.) or mechanical (e.g., sound), by substituting suitable receiving devices, responsive to the particular radiant energy, for the hereinabove disclosed RF antennas.

Also, the above described embodiments of the invention employ a set of three antennas arranged in a triangular array; however, it will be appreciated that one or more additonal antennas may be combined with the set of three antennas, A,B and C, disclosed above, to form different sets of triangular arrays while still utilizing the principles of the invention to measure the angle of arrival and range by processing two or more sets of time differentials.

The addition of a fourth receiving antenna at the tail of the receiver aircraft 11, as it is shown in FIG. 1, can be provided to augment the three antennas A,B and C mounted on the wing tips and nose of the aircraft. In such case, it will be observed that the tail antenna and the two wing tip antennas form a second triangular array which when combined with signal processing as described above, may be used to perform angle of arrival measurements and ranging for sources located generally aft of aircraft 11. Furthermore, one of the wing tip antennas may be combined with a nose antenna and a tail antenna to form still another triangular array that can be used for angle and range measurements for a source off to that particular side of the aircraft; and the opposite wing tip antenna may be combined with the nose and tail antennas for angle of arrival and ranging measurements off to the opposite side of the aircraft.

The array of receiving antennas, or other types of receiving devices, may be mounted on any kind of air, land, sea or space vehicle or transport and the herein above described aircraft 11 is disclosed only as a currently preferred form of the invention.

I claim:

1. An apparatus for passively locating a distant scanning source of radiant energy transmission, comprising: first, second and third receiving devices arranged in a spatial array that forms a triangle in which said devices are located at the apexes of said triangle having a side designated AB between said first and second receiving devices, a side AC between said first and third receiving devices and a side BC between said second and third receiving devices, wherein the lengths of said sides are $l_{AB}$, $l_{AC}$, $l_{BC}$, respectively and the interior angles at the apexes are $\alpha$ associated with said first device, $\beta$ associated with said second device and $\gamma$ associated with said third device, each of said devices being responsive to the receipt of said radiant energy transmission to produce an electrical signal representative thereof such that when said array is oriented generally coplanar with a scan sweep of said transmission, the resulting electrical signals from at least two differently constituted pairs of said devices have a measurable time differential;

time differential signal processing means coupled to said devices for producing at least first and second time differential signals representing said measurable time differentials associated with said two differently constituted pairs of devices; and at least a first angle of arrival processor means having inputs coupled to receive said first and second time differential signals and having an output, said first angle of arrival processor means producing at said output a first signal representing a first angular direction at which said transmission arrives at said array measured as the following function of said first and second time differential signals which are respectively represented by $t_{AB}$ and $t_{BC}$:

$$\phi_1 (fn. \ t_{AB}, \ t_{BC}) = \tan^{-1} \frac{l_{AB} \ t_{BC} \csc \beta}{t_{AB} \ l_{BC}} - \ctn \beta$$

wherein $\phi_1$ is an angle referenced to the side of said triangle designated AB and represents said first angular direction.

2. The apparatus of claim 1 wherein said time differential signal processing means further include means for producing a third time differential signal representing a measurable time differential associated with a third differently constituted pair of said first, second and third receiving devices, and further comprising a second angle of arrival processor means having inputs coupled to receive said first and third time differential signals and having an output, for producing at such output a second signal representing said first angular direction as a function of said first and third time differential signals.

3. The apparatus set forth in claim 2 further comprising a third angle of arrival processor means having inputs coupled to receive said second and third time differential signals and having an output, for producing at such output a third signal representing said first angular direction as a function of said second and third time differential signals.

4. The apparatus set forth in claim 3 wherein said third angle of arrival processor means comprises a means for producing a third signal representing said first angular direction in which said angle $\phi_1$ is determined by the following function of the second and third time differential signals respectively represented by $t_{BC}$ and $t_{AC}$:

$$\phi_1 (fn \cdot t_{BC}, t_{AC}) = \tan^{-1} \left( \frac{l_{AC} t_{BC} \cos \alpha - l_{AC} t_{AC} \cos \beta}{l_{BC} t_{AC} \sin \beta + l_{AC} t_{BC} \sin \alpha} \right).$$

5. The apparatus set forth in claim 2 wherein said second angle of arrival processor means comprises means for producing said second signal representing said first angular direction in which said angle $\phi_1$ is determined by the following function of said first and third time differential signals represented by $t_{AB}$ and $t_{AC}$:

$$\phi_1 (fn \cdot t_{AB} t_{AC}) = \tan^{-1} \left( ctn \; \alpha - \frac{l_{AB} t_{AC} \csc \alpha}{t_{AB} t_{AC}} \right).$$

6. The apparatus of claim 1, wherein said radiant energy transmitted by said source is electromagnetic radiation of radio frequencies, and said first, second and third receiving devices are antennas.

7. The apparatus of claim 1, wherein said array is disposed on the body of a transport.

8. The apparatus of claim 7, wherein said transport is an aircraft, and wherein at least one of said receiving devices is mounted on a wing of said aircraft and at least one other of said receiving devices is mounted on the fuselage of said aircraft.

9. The apparatus of claim 7, wherein said transport is an aircraft, and at least two of said receiving devices are disposed adjacent outboard ends of the wings of said aircraft and the remaining receiving device is disposed on the fuselage of said aircraft.

10. An apparatus for passively locating a distant scanning source of radiant energy transmission, comprising:
first, second and third receiving devices arranged in a spatial array that forms a triangle in which said devices are located at the apexes of said triangle, each of said devices being responsive to the receipt of said radiant energy transmission to produce an electrical signal representative thereof such that when said array is oriented generally coplanar with a scan sweep of said transmission, the resulting electrical signals from at least two differently constituted pairs of said devices have a measurable time differential;
time differential signal processing means coupled to said devices for producing at least first and second time differential signals representing said measurable time differentials associated with said two differently constituted pairs of devices;
at least a first angle of arrival processor means having inputs coupled to receive said first and second time differential signals and having an output, said first angle of arrival processor means producing at said output a first angle signal representing a first angular direction at which said transmission arrives at said array measured as a function of said first and second time differential signals; and
scan rate detector means for detecting a scan rate $\omega_s$ of said source of transmission and for producing a signal representative thereof, and range processor means having a first input for receiving said first angle signal from said output of said first angle of arrival processor representing a measured angle of arrival and having a second input for receiving a signal representing a time differential between a predetermined pair of said first, second and third receiving devices with respect to which the angle of arrival represented by said first angle signal is referenced and a third input for receiving the signal representing said scan rate $\omega_s$ from said detector means, and wherein said range processor means has an output at which a signal is produced which varies as a function of a distance between said array and said source of transmission.

11. An apparatus for passively locating a distant scanning source of radiant energy transmission, comprising:
first, second and third receiving devices arranged in a spatial array that forms a triangle in which said devices are located at the apexes of said triangle, each of said devices being responsive to the receipt of said radiant energy transmission to produce an electrical signal representative thereof such that when said array is oriented generally coplanar with a scan sweep of said transmission, the resulting electrical signals from at least two differently constituted pairs of said devices have a measurable time differential;
time differential signal processing means coupled to said devices for producing first, second and third time differential signals representing said measurable time differentials associated with said three differently constituted pairs of devices;
a first angle of arrival processor means having inputs coupled to receive said first and second time differential signals and having an output, said first angle of arrival processor means producing at said output a first angle signal representing a first angular direction at which said transmission arrives at said array measured as a function of said first and second time differential signals;
a second angle of arrival processor means having inputs coupled to receive said first and third time differential signals and having an output, for producing at such output a second angle signal representing said first angular direction as a function of said first and third time differential signals; and
a third angle of arrival processor means having inputs coupled to receive said second and third time differential signals and having an output, for producing at such output a third angle signal representing said first angular direction as a function of said second and third time differentials signals; and
a scan rate detector means for producing a signal representing a scan rate $\omega_s$ of said source of transmission, and a range processor means, said range processor means having a first input for receiving one of said first, second and third angle signals respectively from said first, second and third angle of arrival processor means representing said first angular direction, a second input for receiving a signal representing one of said first, second or third time differentials produced by said time differential signal processing means, and at least a third input for receiving a signal representing said scan rate $\omega_s$ from said scan rate detector means, said range processor means having an output at which a signal is produced that is proportional to a distance of said source of transmission from said array as a function of signals applied to said first, second and third inputs.

12. The apparatus set forth in claim 11 further comprising signal selection processor means operatively associated with said first, second and third angle of arrival processor means and said range processor means, said signal selection processor means including comparator means for comparing said first, second and third time differential signals produced by said time differential signal processing means and signal gating means for applying the output signal from a selected one of said first, second and third angle of arrival processor means to said first input of said range processor means, said selected one of said processor means being that one which measures said first angular direction as a function of the two largest of said first, second and third time differential signals as determined by said comparator means.

13. A method of locating a distant source of scanning radiant energy transmission, comprising the steps of:
receiving said transmission at each of first, second and third receiving devices that have been arranged in a triangular array which lies generally coplanar with a scan sweep of said transmission, and in which said first, second and third receiving devices are disposed at the apexes of said triangular array;
developing electrical time differential signals from the receipt of said transmission by at least two differently constituted pairs of said first, second and third receiving devices;
processing said time differential signals so as to produce a first output signal representing a first angular direction at which said transmission arrives at said array as a predetermined function of said time differential signals; and
detecting a scan rate $\omega_S$ of said source of transmission and producing a signal representative of said scan rate $\omega_S$, and processing said signals representing said first angular direction and a corresponding one of said time differentials together with said signal representing said scan rate $\omega_S$ to yield a signal representing a range measurement of the distance between said array and said source.

14. The method of claim 13, further comprising the step of developing a third time differential signal from the receipt of said transmission by a third differently constituted pair of said receiving devices.

15. The method of claim 13, further comprising the steps of developing a third time differential signal from the receipt of said transmission by a third differently constituted pair of said receiving devices, and comparing the magnitude of said time differential signals to determine the largest two of the three time differential signals, and processing said largest two of said time differential signals to produce said first output signal representing said first angular direction.

16. The method of claim 13, wherein said radiant energy is electromagnetic energy of radio frequencies, and the steps of receiving said transmission comprise the substeps of disposing radio frequency antennas as said first, second and third receiving devices for receiving and converting said transmission to electrical timing signals.

17. The method of claim 13, wherein the steps of receiving said transmission comprise the substeps of disposing said receiving devices in said array at relatively fixed locations on the body of a transport and orienting said body with respect to said source so as to dispose said array in a common plane with said scan sweep of said source.

* * * * *